Patented Aug. 12, 1941

2,252,170

UNITED STATES PATENT OFFICE 2,252,170

CHEESE PLASTICIZING COMPOSITION

Henry H. Doering, Chicago, Ill.

No Drawing. Application February 26, 1938,
Serial No. 192,788

10 Claims. (Cl. 99—117)

This invention relates to cheese plasticizing substances and the method of processing cheese therewith, and more particularly to nutritious emulsifiers for cheese processing and pasteurization.

It contemplates more especially the provision of a new cheese plasticizing substance possessing food nutritious substances rather than any chemical ingredients of the type that have heretofore been largely, if not entirely, thought necessary for plasticizing or emulsifying cheese during the pasteurization thereof in the production of so-called "process cheese."

This processing consists in the subjection of cheese to heat of sufficiently high temperature to destroy undesirable bacteria, but not sufficiently high to disintegrate the cheese into its component elements of casein and olein. This treatment usually prescribes that the cheese is kept at a temperature from about 140° to 175° F. for a short duration of time during which the cheese is actively stirred. Another process prescribes the subjection of the cheese to a friction pressure reaction which develops heat of pasteurization incident to the frictional reaction on the casein constituent of the cheese.

Irrespective of the method of processing, however, the desired resultant is the pasteurization of the cheese so as to greatly reduce its tendency to deteriorate and, further, to improve the texture, body, slicing qualities and appearance of the cheese. In some cases, different kinds of cheese are blended during the processing to impart improved flavor and more uniform and homogeneous textures as well as keeping qualities. Also, in the case of Camembert, brick and other cheese of extremely soft consistency, it is advantageous to blend a firmer cheese with the soft cheese to obtain a cheese of firmer body which can be more effectively emulsified, packed, sliced and processed for marketing purposes.

In the processing of cheese by one process or another, the cheese is reduced to a plastic state approaching liquidity, and the fat constituent of the cheese has a tendency to become separated from the casein, thereby disintegrating the product and impairing the desired texture thereof in its normal state. This tendency has heretofore been overcome by incorporating therein a small amount of an emulsifying salt of a chemical character during or prior to the processing thereof for effecting pasteurization. In this manner, a pasteurized cheese product is produced with uniform and homogeneous texture. Chemicals have been commonly used as emulsifying agents for this purpose, and attempts have been made to largely dispense with chemicals as an emulsifier, but such usually involve special combinations of ingredients for different cheese in order to render them effective as plasticizers or cheese emulsifiers.

Non-nutritious chemicals have largely, if not entirely, been heretofore regarded as only satisfactory for this purpose. Then, too, it has long been known in scientific literature that alkaline substances are solvents for casein. Since the emulsification of cheese involves the plasticizing or rendering soluble the casein constituent of cheese so that the olein or fatty cheese constituent will be miscible therewith, any number of chemical substances have been used to give satisfactory emulsifying results. These are not considered very advantageous to the human body, and such plasticizers which depart from the primary use of chemicals, still embody a small proportion thereof for cheese having some acidity.

One object of the present invention is to provide a nutritious food composition to serve as a cheese emulsifier that renders the casein and olein constituents of cheese miscible incident to the pasteurization of cheese.

Another object is to provide an improved dietary composition devoid of chemical constituents that renders it possible to pasteurize cheese and improve the homogeneity, texture, slicing and keeping qualities thereof.

Still another object is to provide a nutritious oil and rice derivative composition to serve as a cheese plasticizer effective incident to the pasteurization of cheese.

A further object is to provide a process of emulsifying and pasteurizing cheese by resort to a highly nutritious plasticizing composition having oil and a rice derivative as primary constituents.

A still further object is to provide an edible nutritious plasticizing substance for cheese which is nonchemical and purely nutritious food in character.

Still a further object is to provide an edible nutritious substance for cheese that has an oil base intermixed with a rice derivative to constitute an emulsifier constituent for cheese to effect the plasticizing thereof incident to pasteurization.

Other objects and advantages will appear from the following description of an illustrative embodiment of the present invention.

In the production of process cheese, some chemical expedient is usually employed for changing its normally insoluble casein constituent into a more soluble or plastic state prior or during the pasteurization thereof. The purpose therefor is to render the casein constituent of young cheese miscible with its fat or olein constituent in the presence of water to provide an emulsified pasteurized cheese having the desired moisture content within the limits prescribed by law.

The present invention specifically involves a new principle of emulsifying cheese to impart thereto the desired body, texture, homogeneity, slicing quality, nutritive value, keeping qualities and emulsification. It has been found that by creating a stable nutritious emulsion possessing dietetic characteristics and incorporating such with a finely ground natural cheese prior to or simultaneous cheese to pasteurizing temperatures in accordance with known processes, the product resulting after molding and cooling in preformed packages has a texture which enables it to be readily sliced, consumed and used in a most acceptable and delectable manner.

It is preferred to form a preliminary mixture of rice flour, corn oil and a suitable amount of water. This mixture is placed in a water jacketed container for heating to a temperature between 140° to 200° Fahrenheit and preferably between 160° to 180° while being violently agitated to provide a mechanically emulsified composition. The corn oil may be substituted by other substances such as butter, cotton, peanut or other derivatives of fats or oils to provide an edible and highly nutritious plasticizing composition. It has been discovered, however, that rice flour is unusually advantageous and provides an exceedingly satisfactory cheese plasticizer in combination with corn oil. The preferred constituents and their proportions which have been found desirable though not absolutely critical are as follows:

| | Pounds |
|---|---|
| Rice flour | 1 to 1½ |
| Water | 3 |
| Corn oil | 1½ |

The water is placed in a container and the rice flour with the corn oil intimately mixed therewith by resort to constant agitation while being heated between a temperature range of 140° to 200° F. to form a thin paste. Other rice derivatives such as described in Letters Patent 1,550,681 may be substituted for rice flour which is especially desirable and advantageous for use as a nutritious plasticizing ingredient.

The oil may be added in small amounts while the entire mixture is being violently agitated with a propeller type or other suitable mixing device until the resultant product is a smooth, uniform emulsion. To stabilize this emulsion and render such of exceedingly fine in texture, the resultant mixture is heated between a temperature range preferably between 160° and 180° F. During this step of heating, the composition is preferably actively stirred.

The time of heating may vary depending upon conditions, but under ordinary circumstances a quantity of twenty gallons of said composition should be subjected to the aforesaid temperature range for about one and one-half hours during which it is actively stirred or agitated. These ingredients are thoroughly mixed for several minutes by agitating in a machine similar to a common dough mixer or other suitable device design for that purpose.

The above described emulsion is then added to one hundred (100) pounds of finely ground cheese together with sufficient water to adjust the moisture content to that permitted by law. The resulting cheese product is then ready for final emulsification and pasteurization. This may then be accomplished either in the customary manner of heating and stirring in an open kettle at a temperature between 140° and 150° F. as prescribed in the Kraft Reissue Patent 14,777 until such a time as a smooth, homogeneous product results or by passing through a pasteurizing machine such as described in the Baumgartner et al. Letters Patent numbered 1,997,032.

At such time as the pasteurized cheese becomes plastic and uniform in consistency owing to the pasteurization thereof, it may be transferred by pouring into a preformed container so that after sealing and cooling it is ready for marketing and use. With the teachings of the present invention, it is possible to emulsify and pasteurize cheese and render such acceptable to the trade as government defined "process cheese" without introducing chemical or other non-nutritious adulterants therein. The resultant cheese product contains only readily digestible nutritious substances rather than chemical ingredients which are adulterants.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A cheese plasticizing agent comprising an edible oil and rice flour admixed therewith in the presence of water and heated to comprise an emulsified composition.

2. A cheese plasticizing agent comprising an emulsified composition of rice flour, an edible oil, and water emulsified and stirred together in the presence of heat to constitute an emulsified product.

3. A method of preparing a cheese plasticizing substance which consists in thoroughly mixing an edible rice flour, an edible oil, and water, and then subjecting the mixture to an elevated temperature between 140° F. and 200° F. for a period sufficient to create a uniform cheese emulsifying substance.

4. A method of preparing a cheese plasticizing substance which consists in thoroughly mixing rice flour, an edible oil, and water, and then subjecting the mixture to an elevated temperature for a period sufficient to create a uniform cheese emulsifying substance.

5. A method of preparing a cheese plasticizing substance which consists in thoroughly mixing rice flour, an edible oil, and water, then subjecting the mixture to an elevated boiling temperature between 140° and 200° F., and actively stirring the mixture to create a uniform cheese emulsifying substance.

6. A product of manufacture comprising cheese plasticized with an emulsified mixture of rice flour and an edible fatty material of the class consisting of fatty oils and fats added thereto to provide an emulsified cheese product.

7. A product of manufacture comprising cheese plasticized with a rice flour intermixed with an edible fatty material of the class consisting of fatty oils and fats added thereto to provide an emulsified cheese product.

8. A product of manufacture comprising cheese plasticized with a rice flour intermixed with fatty edible materials of the class consisting of fatty oils and fats and water to provide an emulsified cheese product.

9. A product of manufacture comprising cheese plasticized with a rice flour intermixed with an edible fatty oil and water to provide an emulsified cheese product.

10. A product of manufacture comprising cheese plasticized with a preheated emulsion of rice flour intermixed with an edible fatty oil and water to provide an emulsified cheese product.

HENRY H. DOERING.